(12) United States Patent
Goodwin et al.

(10) Patent No.: US 9,258,203 B1
(45) Date of Patent: Feb. 9, 2016

(54) MONITORING COMPUTER PERFORMANCE METRICS UTILIZING BASELINE PERFORMANCE METRIC FILTERING

(75) Inventors: Robert L Goodwin, Mercer Island, WA (US); David Zhao, Bothell, WA (US); Adrian Tsang Kwong Chan, Bellevue, WA (US); Chieh Wang, Issaquah, WA (US); Michael V Rykov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1964 days.

(21) Appl. No.: 11/541,191

(22) Filed: Sep. 29, 2006

(51) Int. Cl.
*H04L 12/26* (2006.01)
*H04L 12/24* (2006.01)

(52) U.S. Cl.
CPC ........ *H04L 43/0852* (2013.01); *H04L 41/5022* (2013.01); *H04L 41/5035* (2013.01)

(58) Field of Classification Search
CPC ............ H04L 41/5035; H04L 43/0852; H04L 41/5022
USPC .................. 709/224, 201, 203, 223; 370/252, 370/395.21; 455/418; 726/22; 713/230
See application file for complete search history.

(56) References Cited

U.S. PATENT DOCUMENTS

| | | | | |
|---|---|---|---|---|
| 6,047,309 A * | 4/2000 | Dan et al. | ...................... | 709/201 |
| 6,321,264 B1 * | 11/2001 | Fletcher et al. | ............... | 709/224 |
| 6,704,877 B2 * | 3/2004 | Cline et al. | ...................... | 713/320 |
| 6,823,385 B2 * | 11/2004 | McKinnon et al. | ........... | 709/226 |
| 7,437,438 B2 * | 10/2008 | Mogul et al. | .................... | 709/223 |
| 7,551,623 B1 * | 6/2009 | Feroz et al. | ............... | 370/395.21 |
| 7,600,014 B2 * | 10/2009 | Russell et al. | ................ | 709/224 |
| 2002/0099818 A1 * | 7/2002 | Russell et al. | ................ | 709/224 |
| 2002/0198984 A1 * | 12/2002 | Goldstein et al. | ............. | 709/224 |
| 2003/0018767 A1 * | 1/2003 | Chatani et al. | ................ | 709/223 |
| 2003/0229695 A1 * | 12/2003 | Mc Bride | ...................... | 709/224 |
| 2004/0030898 A1 | 2/2004 | Tsuria et al. | | |
| 2005/0102352 A1 * | 5/2005 | Zhang et al. | ................... | 709/203 |
| 2006/0037075 A1 * | 2/2006 | Frattura et al. | ................... | 726/22 |
| 2006/0068769 A1 * | 3/2006 | Adya et al. | ..................... | 455/418 |
| 2006/0153089 A1 * | 7/2006 | Silverman | ...................... | 370/252 |
| 2006/0272031 A1 | 11/2006 | Ache et al. | | |
| 2007/0061447 A1 | 3/2007 | Flores et al. | | |
| 2008/0022003 A1 | 1/2008 | Alve | | |
| 2008/0052394 A1 * | 2/2008 | Bugenhagen et al. | ......... | 709/224 |
| 2008/0104231 A1 * | 5/2008 | Dey et al. | ...................... | 709/224 |
| 2009/0037578 A1 * | 2/2009 | Hattori et al. | ................. | 709/224 |

* cited by examiner

*Primary Examiner* — Aaron Strange
(74) *Attorney, Agent, or Firm* — Knobbe Martens Olson & Bear LLP

(57) ABSTRACT

A system and method for managing performance metric information is provided. Baseline performance metrics, such as network bandwidth capabilities, of various client computing devices may be obtained. The baseline performance metrics can be used to separate client computing devices into one or more groups. Based on the groupings, subsequent performance metrics associated with the one or more monitored groups can be collected in a manner to mitigate performance latencies associated with the baseline performance metric. The subsequent performance metrics can be processed to determine which metrics correspond to a potential performance problem.

23 Claims, 5 Drawing Sheets

MONITORING COMPUTER PERFORMANCE METRICS UTILIZING BASELINE PERFORMANCE METRIC FILTERING

BACKGROUND

Generally described, computing devices, such as personal computers, can access various content via a communication network, such as an intranet or the Internet. In a typical environment, a computing device executes a software application; such as a browser software application, that is configured to communicate over the communication network to acquire content from other computing devices (e.g., content providers) connected to the communication network. In a more complex embodiment, the browser software application on the client computing device can also execute additional software code, such as scripts, etc., provided by a content provider that are designed to facilitate a user experience while accessing content. In a similar light, content providers on the communication network can correspond to a variety of network-enabled services that are designed to facilitate access to content for computing devices and/or the user experience associated with the access of the content.

For many content providers, such as commercial content providers, the user experience associated with computing devices accessing content, such as the time required to access and render content on the display screen, can be a key factor to the operation of the content provider. Nevertheless, in a typical computing system, identifying whether the typical user experience regarding the time to access content is outside of the scope of acceptable standards and an accompanying cause for associated delays can be difficult. This is especially true in systems in which one or more computers are connected via a network.

In one aspect, a diminished user experience regarding the time to access content can be associated with latencies caused by the execution of the additional code by the browser software application on a client computer. In another aspect, a diminished user experience regarding the time to access content can be associated with latencies caused by the software code executing on a content provider computer. In both of the above-mentioned aspects, the latencies caused by the software code may be previously unknown to the content provider. In still a further aspect, a diminished user experience regarding the time to access content can be associated with communication bandwidth latencies caused by the individual connection to the communication network by each computing device (e.g., dial-up, DSL, cable modem, etc.). Although user experience regarding the time to access content can be measured from a start time associated with a content access request by a computing device until a finish time associated with the display of the content on the same computing device, current methodologies cannot isolate latencies associated with a content provider (e.g., latencies caused by the executable code on either the computing device or the content provider) from latencies associated by the computing devices network connection.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method for managing performance metric information is provided. Baseline performance metrics, such as network bandwidth capabilities, of various client computing devices may be obtained. The baseline performance metrics can be used to separate client computing devices into one or more groups. Based on the groupings, subsequent performance metrics associated with the one or more monitored groups can be collected in a manner to mitigate performance latencies associated with the baseline performance metric. The subsequent performance metrics can be processed to determine which metrics correspond to a potential performance problem.

In accordance with an aspect of the invention, a system for monitoring computing device performance in a networked environment is provided. The system includes a content component for facilitating the delivery of content to client computing devices via a communication network. The content component can include or provide one or more executable software code segments for the processing of content on the client computing devices. The processing of the content can correspond to access of the content, rendering of the content, and/or manipulation of the content. The system also includes a performance monitoring component for determining a set of client computing devices corresponding to a threshold network bandwidth. The network bandwidth can be measured and reported by each client computing device. The performance monitoring component can also process performance data corresponding to the execution of the one or more executable software code segments for the set of client computing devices. In accordance with another aspect, a computer-implemented method for monitoring performance associated with client computing devices is provided. In accordance with the method, a content provider service determines a baseline performance measurement corresponding to a number of client computing devices. The content provider service then associates each client computing device into one or more groups based on the corresponding baseline performance measurement. The content provider service can also process performance metrics for at least one group to determine if any performance metric information is indicative of a performance problem.

In accordance with a further aspect, a computer-readable storage medium having a computer-executable component, executed by a computing system, for tracking performance metrics is provided. The computer-executable components include a baseline performance monitoring component for obtaining baseline performance metrics for a number of client computing devices. The baseline performance metrics can be indicative of a measured network connection speed. The baseline performance monitoring component can also generate a distribution of the baseline performance metric for the number of client computing devices. The computer-executable components can also include a performance metric monitoring component for selecting a set of client computing devices from the distribution of performance metrics. The set of client computing devices can be associated with a high speed network connection based on a relative location within the distribution. The performance metric monitoring component can also process data access performance metrics for the selected set of client computing devices.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to the measurement of latencies associated with content requests from client computing devices to content providers. More specifically, the present invention relates to a system and method for identifying latencies associated with the execution of software code or software services provided by a content provider. In an illustrative embodiment, the present invention facilitates the identification of a set of client computing devices in which network bandwidth meets a required threshold. By limiting further analysis of client computing device interaction with the content provider to the set of client computing devices meeting the threshold network bandwidth, any measured latencies for the set of client computing devices can be attributed to latencies in either software code provided by a content provider and executed at a client computing device or in software code executed as part of a software service provided by the content provider. Although the present invention will be described with regard to an illustrative operating environment and methodologies, one skilled in the relevant art will appreciate that the disclosed embodiments should not be construed as limiting.

Figure 1:
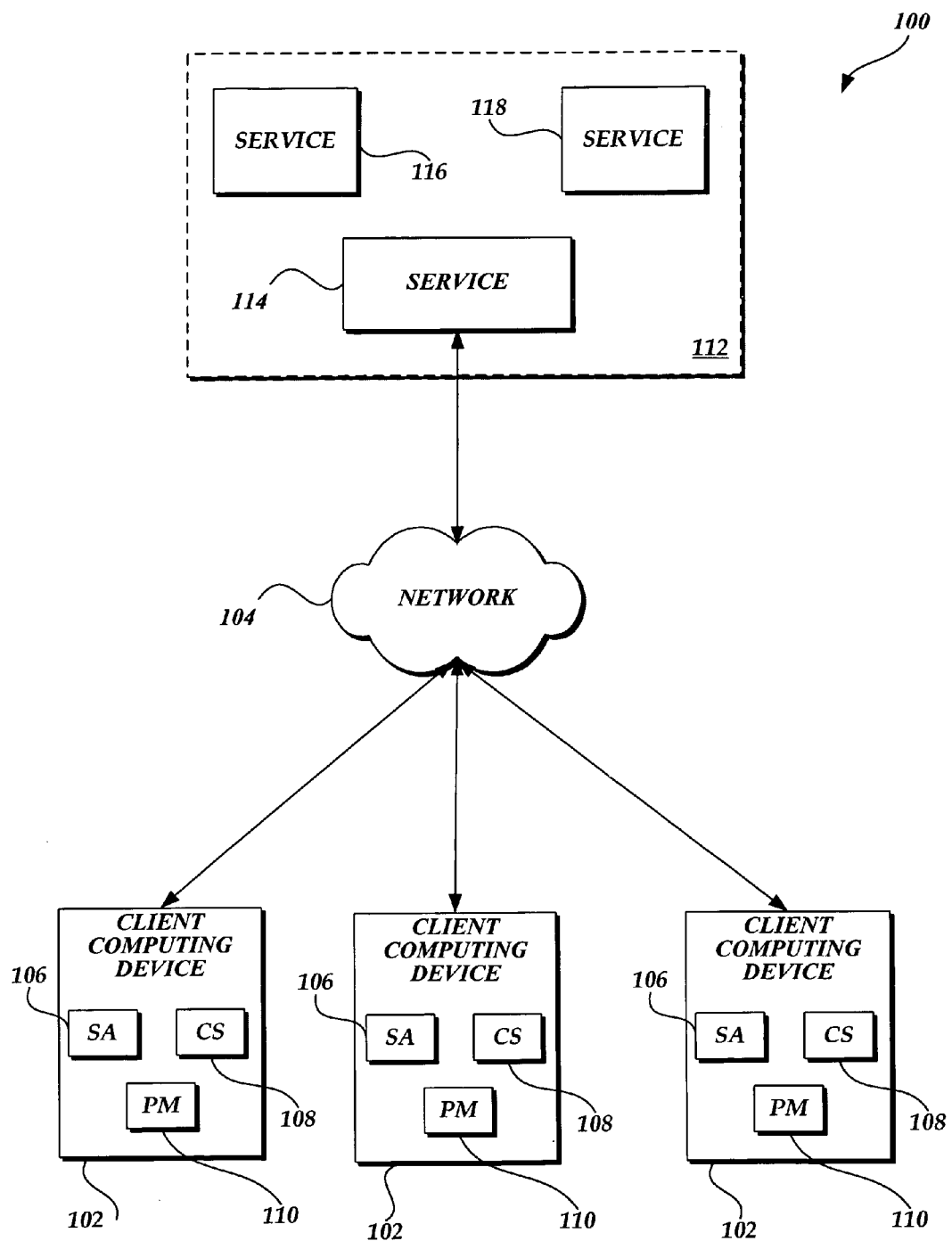
FIG. 1 is a block diagram of an illustrative operating environment for providing content including a content provider and a number of client computing devices for accessing content formed in accordance with an aspect of the present invention.

With reference now to FIG. 1, an illustrative operating environment 100 is shown including one or more client computing devices 102 that transmit information via a communication network 104, such as an intranet or the Internet. In an illustrative embodiment, each client computing device includes a software application 106, such as a browser software application, that facilitates communication via the network 104. Additionally, each software application can include one or more executable code portions 108 provided by a third-party content provider that facilitates interaction of the client computing device with the content provider and/or the rendering/interaction of content provided by the content provider. Each client computing device 102 can further include a performance monitoring software component 110 for tracking one or more variables associated with performance metrics for content requests. For example, a first variable may correspond to the time interval used to execute and begin transmission of a user request. Further, a second variable may correspond to the time used to transmit the request and receive a response via the network 104. One skilled in the relevant art will appreciate that the one or more executable code portions 108 and software performance monitoring software component 110 may correspond to various executable scripts stored on the client computing device 102 and executed by the software application 106.

Those skilled in the art will recognize that the client computing devices 102 can correspond to any one of a number of computing devices, including, but not limited to, personal computers, server computers, set-top boxes, personal digital assistants, mobile phones, digital media players, Web pads, tablets, laptop computers, and the like. Communication protocols and components for providing communication between client computing device(s) 102 and the server 106 via the network 104 are well known to those skilled in the art of computer communications and, thus, need not be described in more detail herein.

With continued reference to FIG. 1, the operating environment 100 also includes a service provider 112 that corresponds to one or more software services 114, 116, 118 for providing content and/or software executable code portions 108, 110 to client computing devices 102. In an illustrative embodiment, the service provider 112 can correspond to a service provider that delivers various content to the client computing devices 102, such as digital media. Additionally, the service provider can deliver various executable code that facilitates the rendering and/or manipulation of the downloaded content. For example, the service provider may provide executable code that allows video media to be rendered on a browser software application. Still further, in accordance with an aspect of the present invention, the software services 114, 116, 118 can include components for measuring performance metric information provided by the client computing devices 102.

Figure 2:
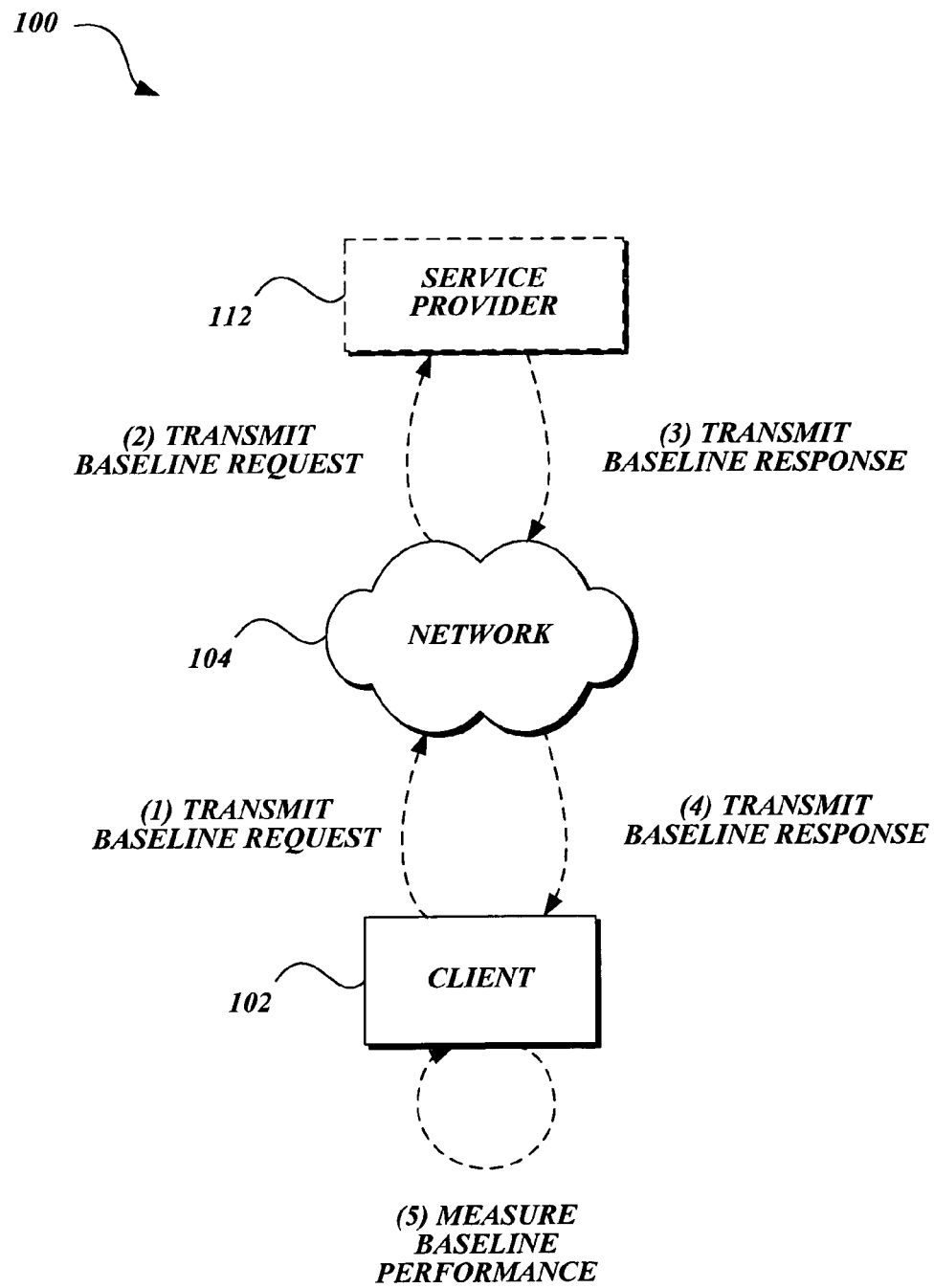
FIG. 2 is a block diagram of the operating environment of FIG. 1 illustrating a client computing device transmission of data to establish a baseline performance metric in accordance with an aspect of the present invention.

With reference now to FIG. 2, the interaction by various components of the operating environment 100 to establish a baseline performance measurement will be described. A client computing device 102 transmits a baseline request via the network 104 to a service provider 112. In an illustrative embodiment, the baseline request can correspond to a request for a ping from the service provider 112. The service provider 112 processes the request and transmits a response via the network 104 to the client computing device 102. After receiving the response, the client computing device 102 can measure the baseline performance of the network connection between the client computing device 102 and the service provider 112. In an illustrative embodiment, the baseline request can correspond to a request in which the processing time required by client computing device(s) 102 and the service provider 112 is known or negligible. The calculated baseline performance metric can then be reported to the service provider 112.

In an illustrative embodiment, time stamps can be used to measure the baseline performance at various intervals. For example, a first time stamp can be recorded when a request is submitted. The submission of a request can correspond to the beginning of the execution of a ping command. When the client computing device 102 first begins transmission to the service provider 112, a second time stamp can be recorded. To get a baseline measurement for the processing time of the request on the client computing device 102, the difference between the first two recorded time stamps can be stored in a first variable. When the server 106 receives the request, a third time stamp can be recorded. The difference between the second and third time stamp can be used to determine the time for transmitting a request from the client computing device 102 to the server 106. A fourth time stamp can be recorded when the server begins transmitting a response to the client computing device 102. The difference between the fourth time stamp and the third time stamp can be used to determine a baseline performance for processing requests on the server 106. A fifth time stamp can be recorded when the client receives the response. The response transmission time can correspond to the difference between the fifth and fourth time stamp. In this manner, the performance of the system 100 can be broken up into elements.

It will be appreciated by one skilled in the art that the performance metrics could be broken down further. For example, timestamps could be recorded at the beginning and end of execution of one or more functions on the client computing device 102. Further, the recorded performance metrics could be combined or simplified. For example, the time to transmit a request and the time to receive a response could be combined into one variable which represents total transmission time. Still further, although the baseline performance metric illustrated in FIG. 2 is described with regard to transmissions between the client computing device 102 and the service provider 112, the client computing device may conduct the baseline performance metric with another computing device on the network 104.

Figure 3:
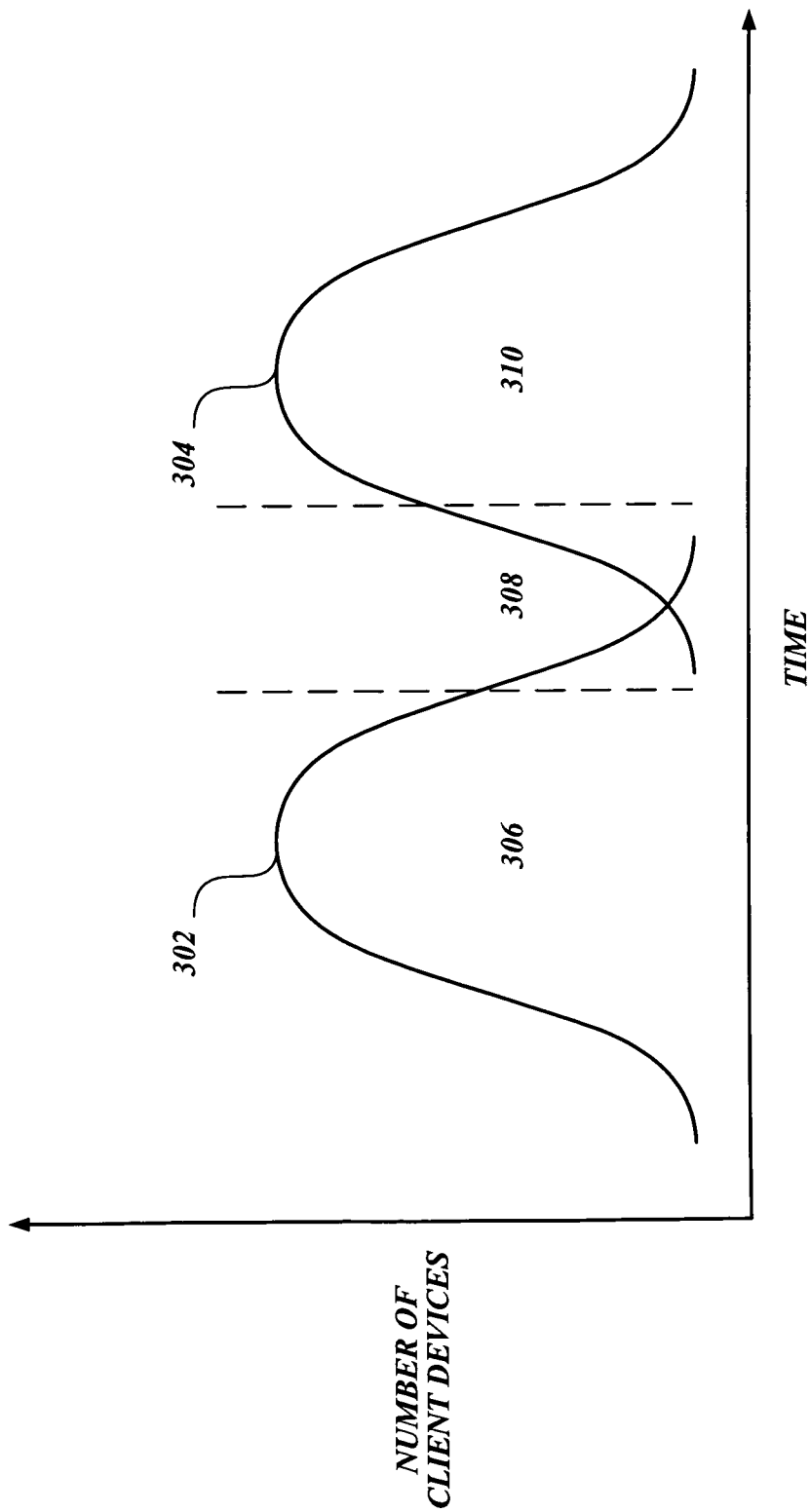
FIG. 3 is a block diagram of a chart representing the distribution baseline performance characteristics of client computing devices in accordance with an aspect of the present invention.

With reference now to FIG. 3, an exemplary distribution of client computing devices 102 according to their baseline performance characteristics will be described. As illustrated in FIG. 3, the x-axis corresponds to time and the y-axis corresponds to the number of client computing devices 102. FIG. 3 further depicts distribution 302 and distribution 304 which can be used to form plot areas 306, 308, and 310. Although normal distributions are depicted, it will be appreciated that other illustrative plots can correspond to other types of distributions. The x-axis can correspond to a specific metric. For example, the transmission time metric may be plotted against the x-axis. In an illustrative embodiment, the distribution of transmission time metrics can be utilized to identify those client computing devices 102 which correspond to the highest bandwidth connections. As illustrated in FIG. 3, the area generally represented in plot area 306 most likely corresponds to client computing devices 102 with a higher bandwidth network connection based on the time recorded for their respective baseline performance metric. The client computing devices 102, which correspond to an indeterminate-level bandwidth connection, will generally be represented in plot area 308. In an illustrative embodiment, plot area 308 may represent a set of client computing devices 102 in which the time recorded for the respective baseline performance metric is not necessarily indicative of a higher bandwidth connection. Further, the client computing devices 102 which correspond to low-bandwidth connections will generally be represented in plot area 310.

In an illustrative embodiment, to ensure that the analysis of subsequent performance metric measurements are not affected by latencies associated with a lower bandwidth network connection, the service provider 112 may select to filter performance metric information from the set of client computing devices which correspond to plot area 306 (high bandwidth connections), that may be selected for monitoring. In an illustrative embodiment, the session identifiers corresponding to the client computing devices 102 represented by plot area 306 can be stored so that these clients are recognized as being monitored.

Although FIG. 3 has been discussed as a plot of the transmission metric; it will be appreciated that the client computing devices 102 can be plotted against other performance metrics. For example, if it is discovered that all client computing devices 102 correspond to a high-bandwidth connection, another performance metric, such as client-processing time, may be used to separate the client computing devices 102 into groups. Further, although FIG. 2 depicts a single request and a single response, it will be appreciated that several baseline measurements could be made off of several request-response intervals in order to determine an average baseline performance measurement. The average baseline performance could then be plotted to separate the client computing devices 102 into groups.

Figure 4:
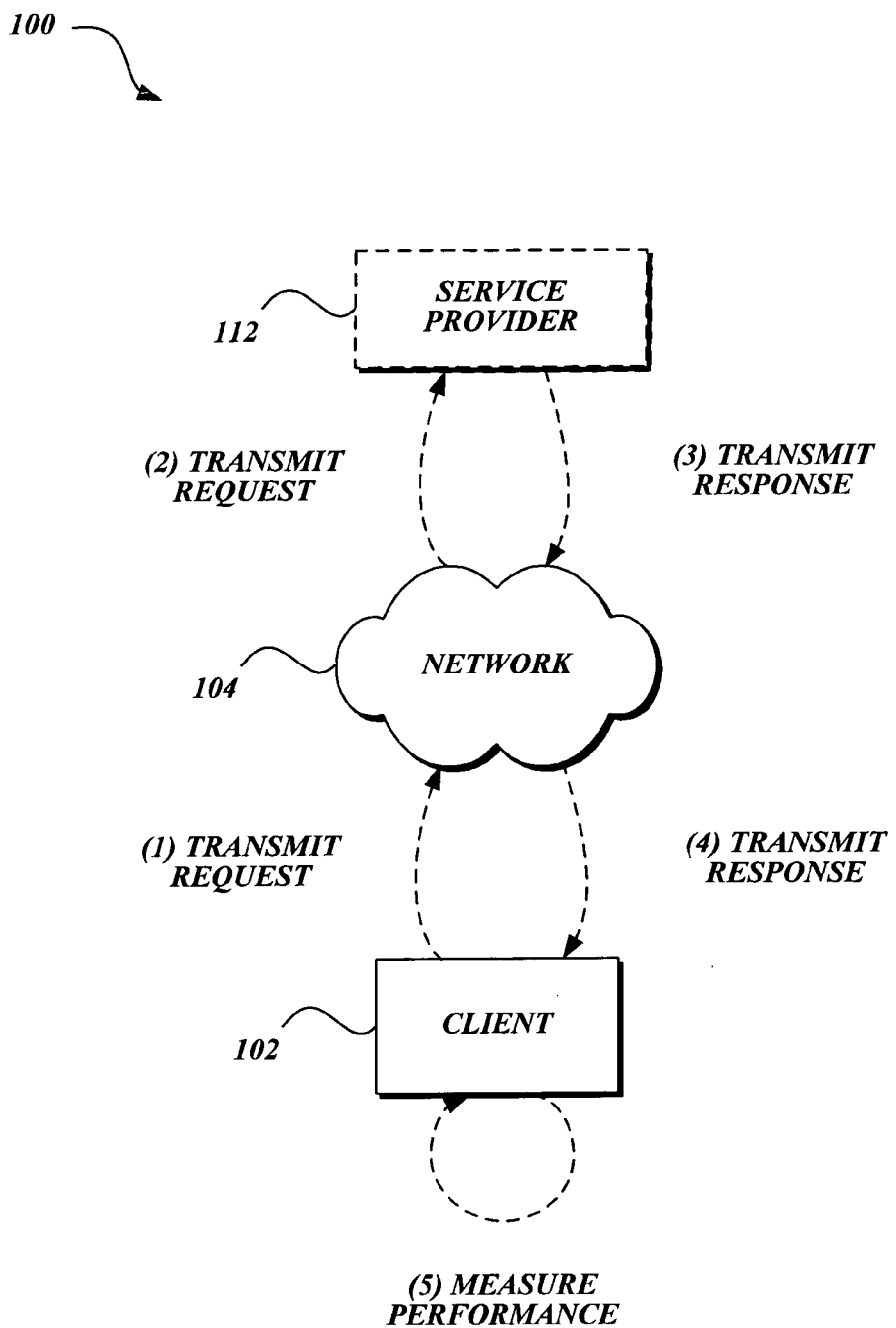
FIG. 4 is a block diagram of the operating environment of FIG. 1 illustrating the transmission of data between a content provider to a client computing device to establish subsequent performance metrics for the client computing device and the content provider in accordance with an aspect of the present invention.

With reference now to FIG. 4, the interaction by various components of the operating environment 100 to determine performance metrics will be described. A client computing device 102 transmits a request via the network 104 to the service provider 112. The request can correspond to a user clicking on a link or interacting with some other type of display control. The service provider 112 processes the request and transmits a response via the network 104 to the client computing device 102. After receiving the response, the client computing device 102 can measure the performance.

In an illustrative embodiment, similar to the calculation of the baseline performance metric, time stamps can be used to measure the performance metrics at various intervals. For example, a first time stamp can be recorded when a user submits a request. A user can submit a request by performing some action on the client computing device 102, such as clicking on a hyperlink or interacting with some other type of display control. When the client computing device 102 first begins transmission to the service provider 112, a second time stamp can be recorded. To get a baseline measurement for the processing time of the request on the client computing device 102, the difference between the first two recorded time stamps can be stored in a first variable. When the service provider 112 receives the request, a third time stamp can be recorded. The difference between the second and third time stamp can be used to determine the time for transmitting a request from the client computing device 102 to the service provider 112. A fourth time stamp can be recorded when the server begins transmitting a response to the client computing device 102. The difference between the fourth time stamp and the third time stamp can be used to determine a baseline performance for processing requests on the service provider 112. A fifth time stamp can be recorded when the client receives the response. The response transmission time can correspond to the difference between the fifth and fourth time stamp. In this manner, the performance of the operating environment 100 can be broken up into elements. Each of the performance metrics can be stored in a variable.

It will be appreciated by one skilled in the art that the performance metrics could be broken down further. For example, timestamps could be recorded at the beginning and end of execution of one or more functions on the client computing device 102. Further, the recorded performance metrics could be combined. For example, the time to transmit a request and the time to receive a response could be combined into one variable which represents total transmission time. In an illustrative embodiment, the performance metrics recorded will correspond to the baseline performance metrics. For example, if the baseline transmission-time metric corresponds to the time to transmit the request and the time to receive the response, then the real-time performance metrics will be recorded accordingly.

Figure 5:
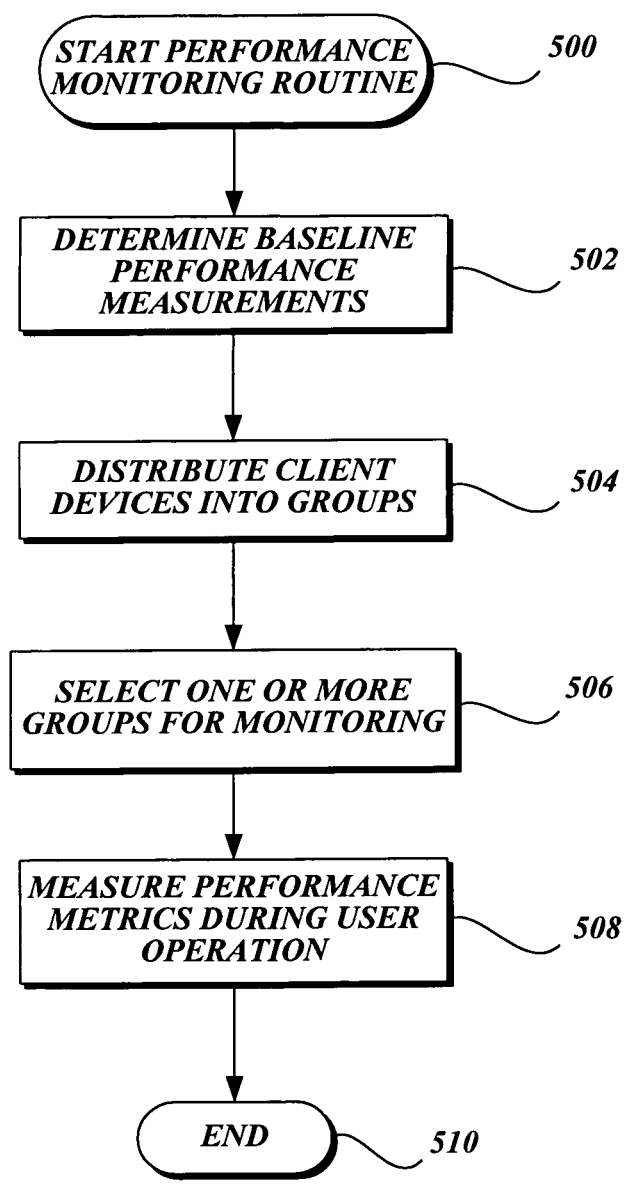
FIG. 5 is a flow diagram of a performance monitoring routine implemented by the client computing device in accordance with an aspect of the present invention.

With reference now to FIG. 5, a flow diagram illustrative of a sample performance monitoring routine implemented by a client computing device 102 will be described. At block 502, baseline performance measurements are determined. As described above in relation to FIG. 2, the baseline performance measurements can be determined by monitoring one or more representative transmissions between the client computing device 102 and the service provider 112. The time-based measurements can be recorded and transmitted by the client computing device 102 to the service provider 112.

At block 504, the content provider can distribute the client computing devices 102 into groups according to one or more baseline performance measurements. An exemplary distribution is illustrated in FIG. 3. In an illustrative embodiment, the client computing devices 102 are distributed according to baseline performance transmission time. At block 506, one or more of the client-device groups are selected for monitoring. In an illustrative embodiment, those client computing devices 102 corresponding to high-bandwidth connections may be selected for monitoring. Alternatively, only those client computing devices 102 with known low bandwidth connections may be excluded from the grouping. One skilled in the relevant art will appreciate that grouping of client computing devices may be done dynamically to coincide with the characteristics of the subsequent performance monitoring analysis being conducted. For example, the content provider may dynamically expand/contract the testing group as part of a subsequent performance monitoring analysis.

At block 508, performance metrics are measured during user operation of the client computing device 102. For example, a user may be interfacing with a Web server via a software browser application and performance measurements can be recorded during the user's session. The performance metrics may be averaged across several request-response intervals. Alternatively, the performance metrics for each request-response interval may be stored separately, such as in an array or other similar data structure. In an alternative embodiment, the performance metrics can be further processed. For example, the processing of the performance metrics can result in the elimination of one or more performance variable. The remaining metrics can be examined to determine if they correspond to performance problems. At block 510, the performance-monitoring routine ends.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for monitoring computing device performance in a networked environment, comprising:
   a content delivery component, executed on a computing system, for facilitating delivery of content to a set of client computing devices via a communication network, wherein the content corresponds to one or more executable software code segments executed on one of the set of client computing devices; and
   a performance metrics monitoring component, executed on the computing system, configured to:
      associate individual client computing devices within the set of client computing devices with respective bandwidth categories within a plurality of bandwidth categories, wherein associating an individual client computing device with a bandwidth category is based at least in part on a baseline measurement of performance for the individual client computing device, wherein the baseline measurement of performance corresponds to at least an indication of network bandwidth and an indication of latency in execution of the one or more executable software code segments on the individual client computing device;
      select a subset of the plurality of bandwidth categories;
      obtain subsequent measurements of performance metrics corresponding to the execution of the one or more executable software code segments by individual client computing devices associated with at least one of the subset of bandwidth categories; and
      provide a distribution of determined latencies for the subset of bandwidth categories, the determined latencies based at least in part on the subsequent measurements of performance metrics;
   wherein a subsequent determination of latency in execution of the software code segments is isolated from a subsequent determination of latency associated with the network bandwidth of client computing devices in a bandwidth category.

2. The system as recited in claim 1, wherein the one or more executable software code segments include executable software code on a software service corresponding to a content provider.

3. The system as recited in claim 1, wherein the performance monitoring component determines the set of client computing devices by comparing baseline performance characteristics for a number of target client computing devices.

4. The system as recited in claim 3, wherein the baseline measurement of performance corresponds to a completion time for one or more data transmissions between a client computing device and a network computing device.

5. The system as recited in claim 3, wherein the baseline measurement of performance corresponds to an average completion time for a plurality of data transmissions between the individual client computing device and a network computing device.

6. The system as recited in claim 3, wherein the performance monitoring component utilizes a distribution of baseline performance characteristics to select the set of client computing devices.

7. The system as recited in claim 1, wherein the performance monitoring component is further configured to process performance data corresponding to an execution of the one or more executable software code segments by comparing a time lapsed for completion of a content-based request from a client computing device.

8. The system as recited in claim 7, wherein the time lapsed for completion of a content-based request from the client computing device corresponds to a difference between a timestamp associated with the initiation of a content-based request and a timestamp associated with completion of the content-based request.

9. A computer-implemented method for monitoring performance associated with client computing devices, the method comprising:
   determining a distribution of baseline performance metric measurements corresponding to a number of client computing devices, wherein a baseline performance metric measurement comprises an indication of network bandwidth and an indication of latency in execution of one or more executable software code segments on a client computing device within the number of client computing devices;
   associating the client computing device into one or more of a plurality of bandwidth categories corresponding to an estimated available bandwidth, wherein the client computing device is associated with a bandwidth category based at least in part on relevant baseline performance metric measurements;
   selecting a subset of the plurality of bandwidth categories for monitoring; and processing subsequent performance metrics for the selected bandwidth categories to determine if any performance metric information is indicative of a performance problem, wherein processing the subsequent performance metrics for the selected bandwidth categories includes determining a distribution of latencies, wherein a latency is associated with execution of the one or more executable software code segments on a client computing device associated with one or more of the selected bandwidth categories.

10. The computer-implemented method of claim 9, wherein determining the baseline performance metric measurement includes measuring performance characteristics associated with a time taken to satisfy a data request issued from the client computing device.

11. The computer-implemented method of claim 10, wherein measuring the performance characteristics associated with the time taken to satisfy the data request corresponds to a difference between a first time associated with an initial request for data and a second time associated with a receipt of a response to the initial request for data.

12. The computer-implemented method of claim 9, wherein associating the client computing device into one or more of the plurality of bandwidth categories based at least in part on the relevant baseline performance measurements includes:
 determining a distribution of client computing device baseline performance measurements;
 associating the client computing device into the one or more of the plurality of bandwidth categories based upon a location of the client computing device within the distribution.

13. The computer-implemented method of claim 9, wherein processing subsequent performance metrics for the selected bandwidth categories to determine if any performance metric information is indicative of a performance problem includes measuring a time taken to satisfy a subsequent data request corresponding to a request for content issued from an individual client computing device associated with at least one of the subset of bandwidth categories.

14. The computer-implemented method of claim 9, wherein the baseline performance metric measurement corresponds to a network bandwidth, and wherein at least one bandwidth category corresponds to client computing devices associated with a high speed network bandwidth and at least one bandwidth category corresponds to client computing devices associated with a low speed network bandwidth.

15. The computer-implemented method of claim 14, wherein at least one bandwidth category corresponds to client computing devices associated with an indeterminate speed network bandwidth.

16. A non-transitory computer-readable storage medium having a computer-executable component, executed by a computing system, for tracking performance metrics, the computer-executable component comprising:
 a baseline performance monitoring component for obtaining baseline performance metrics for a plurality of client computing devices, the baseline performance metrics indicative of at least a network connection speed, and for generating a distribution of the baseline performance metrics, the distribution associated with categories of available bandwidth, wherein the distribution of the baseline performance metrics is indicative of a first set of client computing devices having a first determinate speed network connection, a second set of client computing devices having a second determinate speed network connection, and a third set of client computing devices having an indeterminate speed network connection; and
 a performance metric monitoring component for selecting a subset of client computing devices from the distribution of performance metrics, wherein the subset of client computing devices is associated with a high speed network connection category, and for processing subsequent data access performance metrics for the selected subset of client computing devices, wherein the performance metric monitoring component processes subsequent data access performance metrics for the selected subset of client computing devices independent from latencies common to the network connection speed of the selected subset of client computing devices.

17. The non-transitory computer-readable storage medium of claim 16, wherein the baseline performance metric corresponds to a time measured to complete a data transmission request.

18. The non-transitory computer-readable storage medium of claim 17, wherein the baseline performance metric corresponds to a time measured to complete a series of data transmission requests.

19. The non-transitory computer-readable storage medium of claim 16, wherein the first set of client computing devices having a first determinate speed network connection corresponds to a first set of client computing devices having a high speed network connection, and wherein the second set of client computing devices having a second determinate speed network connection corresponds to a second set of client computing devices having a low speed network connection.

20. The non-transitory computer-readable storage medium of claim 16, wherein the performance monitoring component selects only those computing devices associated with the first set of client computing devices having a high speed network connection.

21. The non-transitory computer-readable storage medium of claim 16, wherein the performance monitoring component selects only those computing devices associated with the first set of client computing devices having a high speed network connection and the second set of client computing devices having an indeterminate speed network connection.

22. The non-transitory computer-readable storage medium of claim 16, wherein the data access performance metrics for the set of client computing devices corresponds to a time measured to complete a data access request.

23. The non-transitory computer-readable storage medium of claim 16, wherein the performance monitoring component further identifies any data access performance metrics for the set of client computing device outside of a threshold of acceptable values.

* * * * *